(12) United States Patent
Sweat et al.

(10) Patent No.: US 12,716,819 B2

(45) Date of Patent: Aug. 25, 2026

(54) MOLD AND TESTING FIXTURE FOR FIBER INTERFACE STRENGTH TEST

(71) Applicant: The Florida State University Research Foundation, Inc., Tallahassee, FL (US)

(72) Inventors: Rebekah Sweat, Tallahassee, FL (US); Gerald Horne, Tallahassee, FL (US); Ayou Hao, Tallahassee, FL (US); Ana De Leon, Tallahassee, FL (US); Mehul Tank, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 759 days.

(21) Appl. No.: 18/119,094

(22) Filed: Mar. 8, 2023

(65) Prior Publication Data

US 2023/0332989 A1 Oct. 19, 2023

Related U.S. Application Data

(60) Provisional application No. 63/320,506, filed on Mar. 16, 2022.

(51) Int. Cl.
*G01N 1/00* (2006.01)
*G01N 1/36* (2006.01)

(52) U.S. Cl.
CPC ......... *G01N 1/36* (2013.01); *G01N 2001/366* (2013.01)

(58) Field of Classification Search
None
See application file for complete search history.

(56) References Cited

U.S. PATENT DOCUMENTS

2010/0111770 A1* 5/2010 Hwang ............. B01L 3/502707 428/425.5

OTHER PUBLICATIONS

Bedi, H.S et al., "Interfacial shear strength of carbon nanotubes based hybrid composites: effect of loading rate," Frattura ed Integrità Strutturale, vol. 13, No. 48, pp. 571-576, Mar. 2019, doi: 10.3221/IGF-ESIS.48.55.

Pastuszak, P. D. and Muc, A., "Application of Composite Materials in Modern Constructions," KEM, vol. 542, pp. 119-129, Feb. 2013, doi: 10.4028/www.scientific.net/KEM.542.119.

(Continued)

*Primary Examiner* — Jyoti Mutreja
*Assistant Examiner* — Jyoti Nagpaul
(74) *Attorney, Agent, or Firm* — Meunier Carlin & Curfman LLC

(57) ABSTRACT

Various implementations include a mold for forming composite samples for a pullout test. The mold includes a body having a first surface and a second surface spaced apart from the first surface. The first surface defines one or more slots and one or more channels. Each of the one or more channels has a longitudinal axis. At least one of the one or more channels intersects one of the one or more slots. Various other implementations include a method of forming a composite sample for a pullout test. The method includes providing a mold as described above; disposing a resin within one of the slots; disposing a fiber within at least one of the channels intersecting the one of the slots such that a portion of the fiber is disposed within the one of the slots; and causing the resin to cure.

20 Claims, 10 Drawing Sheets

(56) References Cited

OTHER PUBLICATIONS

Zhang, X. et al., "Interfacial Microstructure and Properties of Carbon Fiber Composites Modified with Graphene Oxide," ACS Appl. Mater. Interfaces, vol. 4, No. 3, pp. 1543-1552, Mar. 2012, doi: 10.1021/am201757v.
Teklal, F. et al., "A review of analytical models to describe pullout behavior—Fiber/matrix adhesion," Composite Structures, vol. 201, pp. 791-815, Oct. 2018, doi: 10.1016/j.compstruct.2018.06.091.
Wang, R.-M et al., "Introduction to polymer matrix composites," in Polymer Matrix Composites and Technology, Elsevier, 2011, pp. 1-548. doi: 10.1533/9780857092229.1.
Zhandarov, S. et al., "Three Specimen Geometries and Three Methods of Data Evaluation in Single-Fiber Pullout Tests," Mech Compos Mater, vol. 55, No. 1, pp. 69-84, Mar. 2019, doi: 10.1007/s11029-019-09793-1.
Hou, Y. and Sun, T., "An improved method to make the microdroplet single fiber composite specimen for determining the interfacial shear strength," J Mater Sci, vol. 47, No. 11, pp. 4775-4778, Jun. 2012, doi: 10.1007/s10853-012-6317-2.
Piggott, M. R., "The interface between glass and carbon fibers and thermosetting polymers," Polymer Composites, vol. 6, No. 4, pp. 242-248, 1985, doi: 10.1002/pc.750060409.
Sockalingam, S. and Nilakantan, G., "Fiber-Matrix Interface Characterization through the Microbond Test," International Journal of Aeronautical and Space Sciences, vol. 13, No. 3, pp. 282-295, Sep. 2012, doi: 10.5139/IJASS.2012.13.3.282.
Teuber, L. et al., "Single fibre pullout test versus short beam shear test: comparing different methods to assess the interfacial shear strength," J Mater Sci, vol. 48, No. 8, pp. 3248-3253, Apr. 2013, doi: 10.1007/s10853-012-7107-6.
Miller, B. et al., "A microbond method for determination of the shear strength of a fiber/resin interface," Composites Science and Technology, vol. 28, No. 1, pp. 17-32, Jan. 1987, doi: 10.1016/0266-3538(87)90059-5.
Hodzic, A., "The microdroplet test: experimental and finite element analysis of the dependance of failure mode on droplet shape," Composite Interfaces, vol. 6, No. 4, pp. 375-389, Jan. 1998, doi: 10.1163/156855498X00379.
Thomason, J. L. and Yang, L. "Temperature dependence of the interfacial shear strength in glass-fibre polypropylene composites," Composites Science and Technology, vol. 71, No. 13, pp. 1600-1605, Sep. 2011, doi: 10.1016/j.compscitech.2011.07.006.
Zhou, J. et al., "Interfacial shear strength of microwave processed carbon fiber/epoxy composites characterized by an improved fiber-bundle pullout test," Composites Science and Technology, vol. 133, pp. 173-183, Sep. 2016, doi: 10.1016/j.compscitech.2016.07.033.
Beter, J. et al., "Comparison and Impact of Different Fiber Debond Techniques on Fiber Reinforced Flexible Composites," Polymers, vol. 12, No. 2, p. 472, Feb. 2020, doi: 10.3390/polym12020472.
J.-W. Kim et al., "Modifying carbon nanotube fibers: A study relating apparent interfacial shear strength and failure mode," Carbon, vol. 173, pp. 857-869, Mar. 2021, doi: 10.1016/j.carbon.2020.11.055.
Patterson, B. A. and Sodano, H.A., "Enhanced Interfacial Strength and UV Shielding of Aramid Fiber Composites through ZnO Nanoparticle Sizing," ACS Appl. Mater. Interfaces, vol. 8, No. 49, pp. 33963-33971, Dec. 2016, doi: 10.1021/acsami.6b07555.
Yang, Q.-S. and Liu,X., "13—Mechanical behavior of extra-strong CNT fibers and their composites," in Toughening Mechanisms in Composite Materials, Q. Qin and J. Ye, Eds. Woodhead Publishing, 2015, pp. 339-372. doi: 10.1016/B978-1-78242-279-2.00013-5.
Achenbach, J.D. and Zhu, H., "Effect of interfacial zone on mechanical behavior and failure of fiber-reinforced composites," Journal of the Mechanics and Physics of Solids, vol. 37, No. 3, pp. 381-393, Jan. 1989, doi: 10.1016/0022-5096(89)90005-7.
Yang, L. and Thomason, J.L., "Interface strength in glass fibre-polypropylene measured using the fibre pullout and microbond methods," Composites Part A: Applied Science and Manufacturing, vol. 41, No. 9, pp. 1077-1083, Sep. 2010, doi: 10.1016/j.compositesa.2009.10.005.
Deng, et al., "Measurement of interfacial shear strength of carbon fibre/epoxy composites using a single fibre pullout test," Advanced Composite Materials, vol. 7, No. 2, pp. 169-182, Jan. 1998, doi: 10.1163/156855198X00129.
Miller, B. et al., "Measurement and mechanical aspects of the microbond pullout technique for obtaining fiber/resin interfacial shear strength," Composites Science and Technology, vol. 42, No. 1, pp. 207-219, Jan. 1991, doi: 10.1016/0266-3538(91)90018-K.
Zhandarov, S. and Mäder, E., "Characterization of fiber/matrix interface strength: applicability of different tests, approaches and parameters," Composites Science and Technology, vol. 65, No. 1, pp. 149-160, Jan. 2005, doi: 10.1016/j.compscitech.2004.07.003.
Zhandarov, S. et al., "Investigation of load transfer between the fiber and the matrix in pullout tests with fibers having different diameters," Journal of Adhesion Science and Technology, vol. 15, No. 2, pp. 205-222, Jan. 2001, doi: 10.1163/156856101743418.
Ikramullah et al., "Evaluation of Interfacial Fracture Toughness and Interfacial Shear Strength of *Typha* Spp. Fiber/Polymer Composite by Double Shear Test Method, " Materials, vol. 12, No. 14, p. 2225, Jul. 2019, doi: 10.3390/ma12142225.
Day, R. J. and Rodrigez, J.V.C., "Investigation of the micromechanics of the microbond test," Composites Science and Technology, vol. 58, No. 6, pp. 907-914, Jan. 1998, doi: 10.1016/S0266-3538(97)00197-8.
Gorbatkina, Yu. A. et al., "Adhesive strength of bonds of polymers with carbon fibres at different loading rates," Fibre Chem, vol. 31, No. 5, pp. 405-409, Sep. 1999, doi: 10.1007/BF02364376.
Dassios, K. G. "A Review of the Pullout Mechanism in the Fracture of Brittle-Matrix Fibre-Reinforced Composites," Advanced Composites Letters, vol. 16, No. 1, p. 096369350701600, Jan. 2007, doi: 10.1177/096369350701600102.
Chen, J. et al., "A review of the interfacial characteristics of polymer nanocomposites containing carbon nanotubes," RSC Adv., vol. 8, No. 49, pp. 28048-28085, 2018, doi: 10.1039/C8RA04205E.
Byrne, M. T. and Gun'Ko, Y.K., "Recent Advances in Research on Carbon Nanotube-Polymer Composites," Advanced Materials, vol. 22, No. 15, pp. 1672-1688, 2010, doi: 10.1002/adma.200901545.
Nishikawa, M. et al., "Micromechanical modeling of the microbond test to quantify the interfacial properties of fiber-reinforced composites," International Journal of Solids and Structures, vol. 45, No. 14-15, pp. 4098-4113, Jul. 2008, doi: 10.1016/j.ijsolstr.2008.02.021.

* cited by examiner

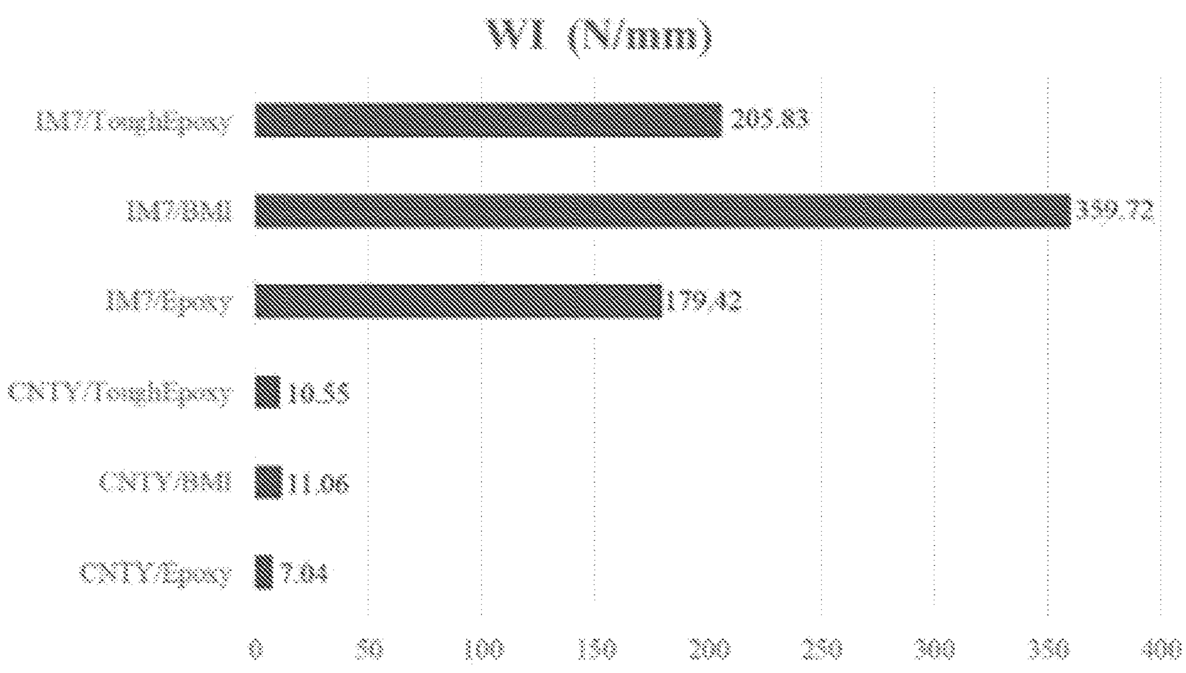
FIG. 9
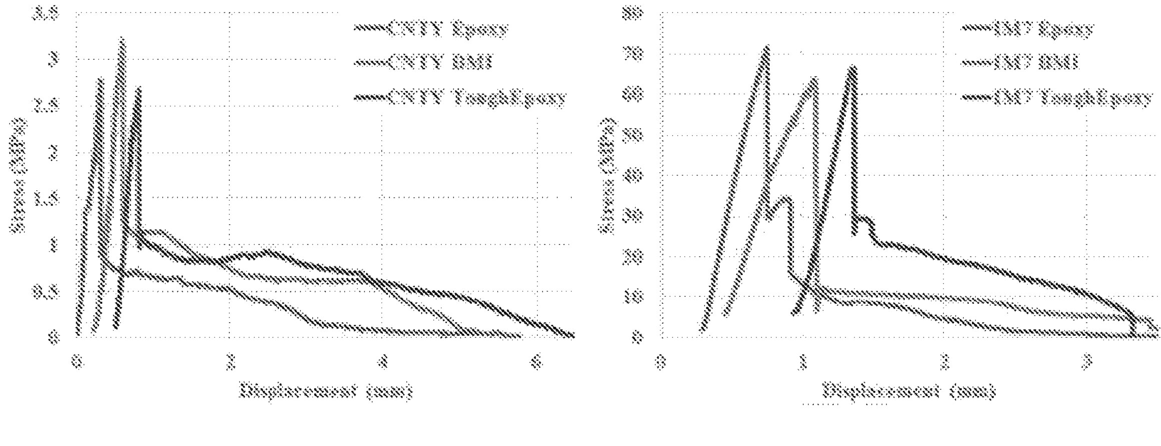
FIG. 10A
FIG. 10B

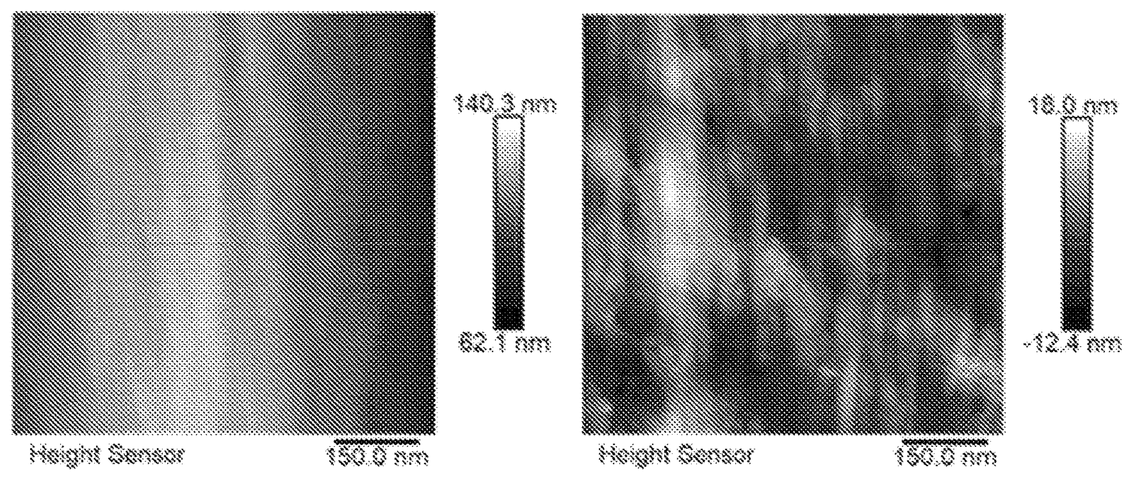
FIG. 11A
FIG. 11B
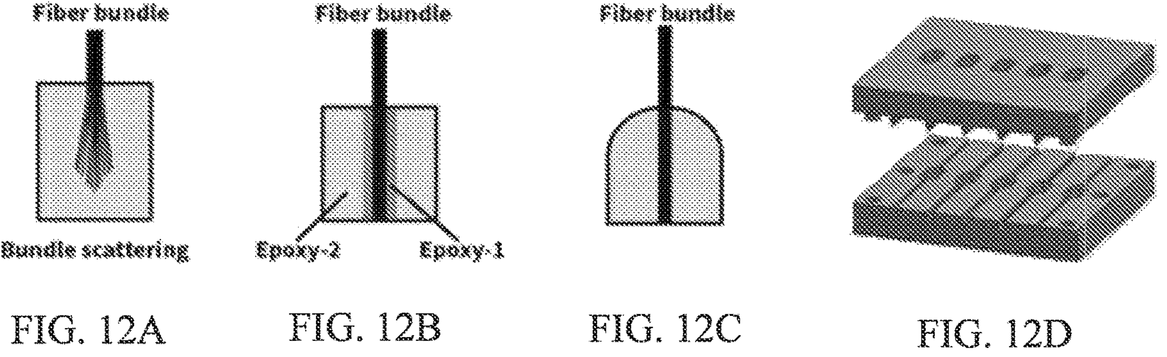
FIG. 12A
FIG. 12B
FIG. 12C
FIG. 12D

MOLD AND TESTING FIXTURE FOR FIBER INTERFACE STRENGTH TEST

CROSS REFERENCE TO RELATED APPLICATIONS

This application claims the benefit of and priority to U.S. Provisional Patent Application No. 63/320,506, filed Mar. 16, 2022, the contents of which are hereby incorporated by reference in full and made a part hereof.

BACKGROUND

Due to safety regulations, the certification of composite materials for the aerospace and automotive industries must be performed before a product form can be in service. These composites are expected to resist complex loading and harsh environments; therefore, they must retain their mechanical performance at quasi-static and dynamic loading conditions. The certification process is expensive and time-consuming due to the amount of material and equipment required for full-scale tests. The world's total output of composites is in megatons; however, it is still minimal compared with the output of steel and plastics. As a result, there is a high need to speed up the development of composites. Nanocomposites specifically have been underutilized because their performance cannot be quantified with a small amount of material repeatably.

Composite materials are multi-component and multi-phase systems constituted by a matrix and reinforcement; however, the performance and durability are dependent on the strength of the fibers, chemical stability of the matrix, and the fiber-matrix interface. Near the interface, the reinforcement and matrix have complex structures different from matrix and reinforcement. Good interfacial bonding ensures efficient load transfer from matrix to reinforcements, reducing stress concentrations and improving the material's mechanical properties. Therefore, the characterization of this adhesion is of great importance.

The parameter that evaluates the adhesion between the fiber and matrix is the interfacial shear strength (IFSS). This can be estimated through fiber bundle pullout tests where the fiber is externally loaded from the matrix. This method is one of the oldest used to measure fiber-matrix adhesion and has improved the most in recent years. In addition, the pullout test is the most popular method to evaluate IFSS due to its versatility since it can be used in a wide range of fiber-matrix systems. In addition, this technique provides direct measurements of interfacial adhesion relative to bulk composite methods such as the Short Beam Shear (SBS) test that measures Interlaminar Shear Strength (ILSS). Based on the sample's scale, the pullout technique can be classified as a microbond test, fiber-bundle pullout test (FBPO), and single-fiber pullout test (SFPO).

The interface strength between matrix and reinforcement is challenging to quantify with meaningful data and statistics due to complex specimen handling, specialty equipment needed, and preparation. Compared to other testing methods, the failure rate resulting in an invalid pullout surpasses 75%. In addition, the pullout test presents a higher variance in results; therefore, more specimens need to be tested. The existing published methodology uses a vertical sample manufacturing that causes fiber bundle scattering and is limited to low viscosity matrices. The current state-of-art for the test produces a single sample per batch, making this process time-consuming.

Thus, a need exists for a fast and straightforward way to manufacture pullout samples in large quantities.

BRIEF DESCRIPTION OF DRAWINGS

Example features and implementations are disclosed in the accompanying drawings. However, the present disclosure is not limited to the precise arrangements and instrumentalities shown.

FIG. 9 is a graph of the work of the interface (WI) results of the constituent fiber/matrix pairings.

FIG. 10A is a graph of Stress v. Displacement curves for CNTY reinforcement with various resin types.

FIG. 10B is a graph of Stress vs. Displacement curves for IM7 reinforcement with various resin types.

FIG. 11A is an AFM image with fiber orientation in the y-direction for IM7 carbon fiber.

FIG. 11B is an AFM image with fiber orientation in the y-direction for CNT yarn.

FIG. 12A is a side view of bundle scattering according to one implementation.

FIG. 12B is a side view of a bundle coated with two epoxies according to one implementation.

FIG. 12C is a side view of pullout samples from a horizontal mold, according to one implementation.

FIG. 12D is a perspective view of a horizontal mold with different channel geometries.

DETAILED DESCRIPTION

Figures 1A, 1B, 1C:
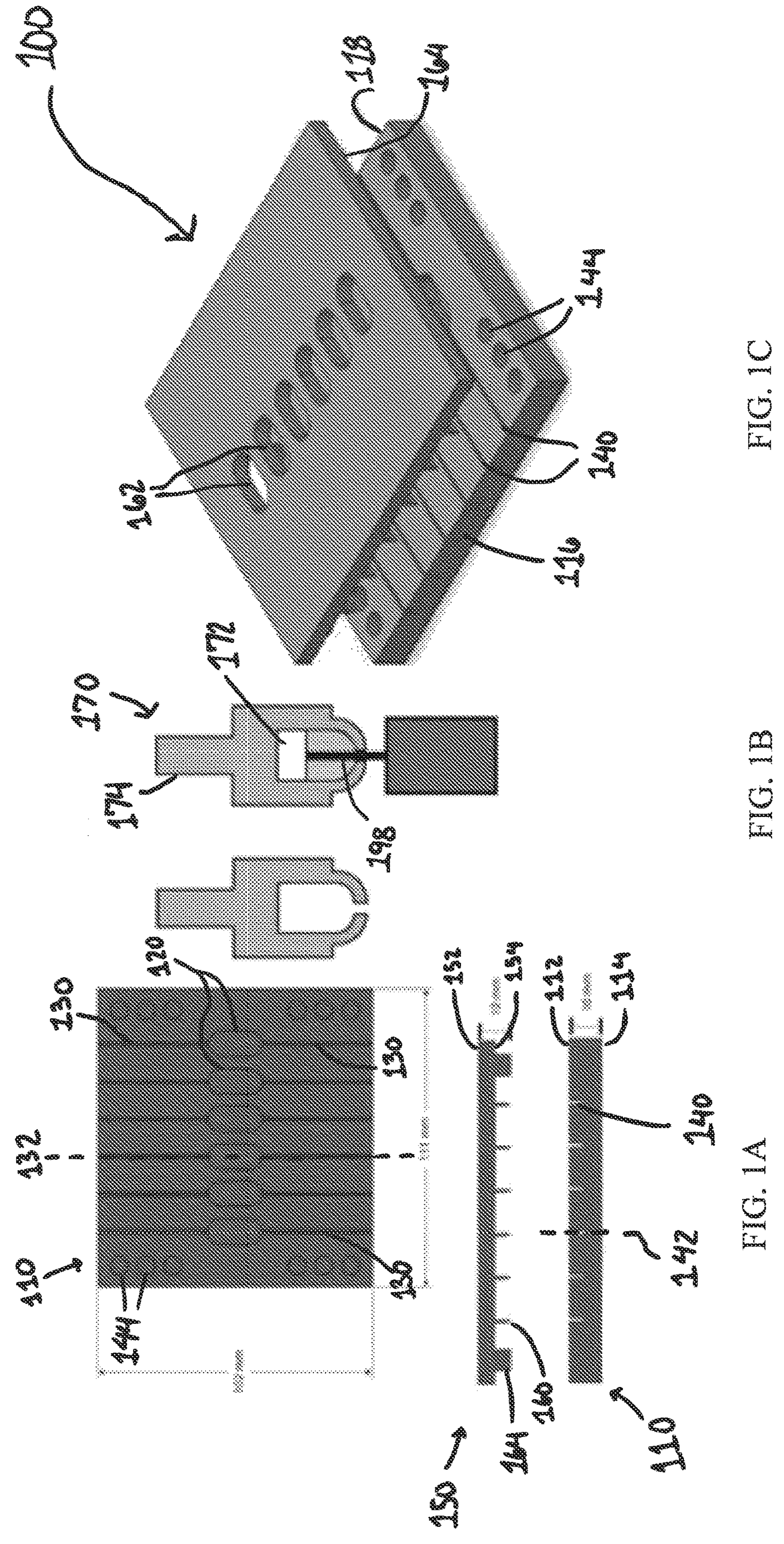
FIG. 1A is a top view and end view of a mold for forming composite samples for a pullout test, according to one implementation.
FIG. 1B is a side view of a testing fixture used to perform pullout tests on composite samples formed with the mold of FIG. 1A.
FIG. 1C is a perspective view of the mold of FIG. 1A.

The devices, systems, and methods disclosed herein provide for a horizontal mold that includes a fiber embedded in a matrix encapsulation, and a geometry matched testing fixture for manufacturing samples for the pullout test. The mold allows the manufacturing of both nanoscale and microscale samples. To test the devices, systems, and methods disclosed herein, SFPO and FBPO were used to evaluate the interfacial adhesion between carbon nanotube (CNT) yarns and IM7 Carbon Fiber (CF) with three different polymer matrices. The effectiveness of the data was validated based on stress vs. displacement curves, microscopical observations, and statistical analysis.

Various implementations include a mold for forming composite samples for a pullout test. The mold includes a body having a first surface and a second surface spaced apart from the first surface. The first surface defines one or more slots and one or more channels. Each of the one or more channels has a longitudinal axis. At least one of the one or more channels intersects one of the one or more slots.

Various other implementations include a method of forming a composite sample for a pullout test. The method includes providing a mold for forming composite samples for a pullout test, as described above; disposing a resin within the one of the one or more slots; disposing a fiber within the at least one of the one or more channels intersecting the one of the one or more slots such that a portion of the fiber is disposed within the one of the one or more slots; and causing the resin to cure.

FIGS. 1A-2G show a mold 100 for forming composite samples for a pullout test, according to aspects of various embodiments. The mold 100 includes a first body 110 and a second body 150.

The first body 110 has a first surface 112 and a second surface 114 spaced apart from the first surface 112. The first body 110 further has a first end surface 116 extending between the first surface 112 and the second surface 114 and a second end surface 118 spaced apart from the first end surface 116. The first surface 112 of the first body 110 defines six slots 120 and twelve channels 130 each having a longitudinal axis 132.

Each of the six slots 120 are discorectangular shaped as viewed in a plane defined by the first surface 112. However, in other implementations, each of the slots can be any other closed shape as viewed in a plane defined by the first surface.

Two of the twelve channels 130 intersect each of the six slots 120 such that the longitudinal axes of the two channels 132 intersecting the same slot 120 are collinear. Six of the channels 130 extend to the first end surface 116, and the other six channels 130 extend to the second end surface 118. The first end surface 116 and the second end surface 118 each define six grooves 140, each having a longitudinal axis 142. The longitudinal axis of each of the twelve channels 132 intersects a longitudinal axis of a different one of the grooves 142.

The first surface 112 of the first body 110 of the mold 100 shown in FIGS. 1A-2G defines six slots 120 and twelve channels 130, but in other implementations, the first surface of the first body defines any number of one or more slots and any number of one or more channels. In some implementations, the first surface of the first body defines one or three or more channels intersecting each slot. In some implementations, the channels intersecting one slot can be oriented in any way and their longitudinal axes are not colinearly aligned. In some implementations, the longitudinal axis of one or more channels intersecting one or more slots is parallel to the longitudinal axis of the respective one or more slots. In some implementations, one or more of the channels does not extend to the first end surface, the second end surface, or both.

The second body 150 has a first surface 152 and a second surface 154 spaced apart from the first surface 152 of the second body 150. The second surface 154 of the second body 150 defines twelve ridges 160, and each of the twelve ridges 160 is configured to be disposed within a separate one of the twelve channels 130 when the second surface 154 of the second body 150 is disposed adjacent the first surface 112 of the first body 110. In implementations in which the first surface of the first body includes any other number of channels, the second surface of the second body includes an equal number of ridges corresponding to the channels of the first body. In some implementations, the second surface of the second body does not include any ridges.

The second surface 154 of the second body 150 further defines six resin openings 162 extending to the first surface 152 of the second body 150. Each of the six resin openings 162 is configured to be disposed adjacent to a separate one of the six slots 120 of the first body 110 when the second surface 154 of the second body 150 is disposed adjacent the first surface 112 of the first body 110. Thus, each of the six slots 120 is in fluid communication with a different one of the resin openings 162 when the first body 110 and the second body 150 are combined.

Although the second surface 154 of the second body 150 shown in FIGS. 1A-2G defines six resin openings 162, in other implementations, the second surface of the second body includes any number of resin openings in fluid communication with any number of slots of the first body when the first body and the second body are combined.

The first surface 112 of the first body 110 defines twelve locator openings 144, and the second surface 154 of the second body 150 defines twelve locator protrusions 164. Each of the twelve locator protrusions 164 are configured to be disposed within a different one of the twelve locator openings 144 when the second surface 154 of the second body 150 is disposed adjacent the first surface 112 of the first body 110. The locator openings 144 and locator protrusions 164 provide for alignment of the first body 110 relative to the second body 150 to ensure consistency in the composite samples formed by the mold, as discussed below.

Although the mold 100 shown in FIGS. 1A-2G includes twelve locator openings 144 and twelve locator protrusions 164, in some implementations, the mold includes any number of locator openings and locator protrusions. In FIGS. 1A-2G, the second body 150 includes the locator protrusions 164 and the first body 110 includes the locator openings 144, but in other implementations, the second body includes the locator openings, and the first body includes the locator protrusions. In some implementations, the first body and the second body include any other features configured to interact with each other to align the first body with the second body. In some implementations, the first body and the second body do not include any alignment features.

The first body 110 and the second body 150 shown in FIGS. 1A-2G are made of silicone, but in other implementations, the first body and/or the second body are made of any other suitable material for forming a composite sample or any combination of materials.

Figures 2A, 2B, 2C, 2D, 2E, 2F, 2G:
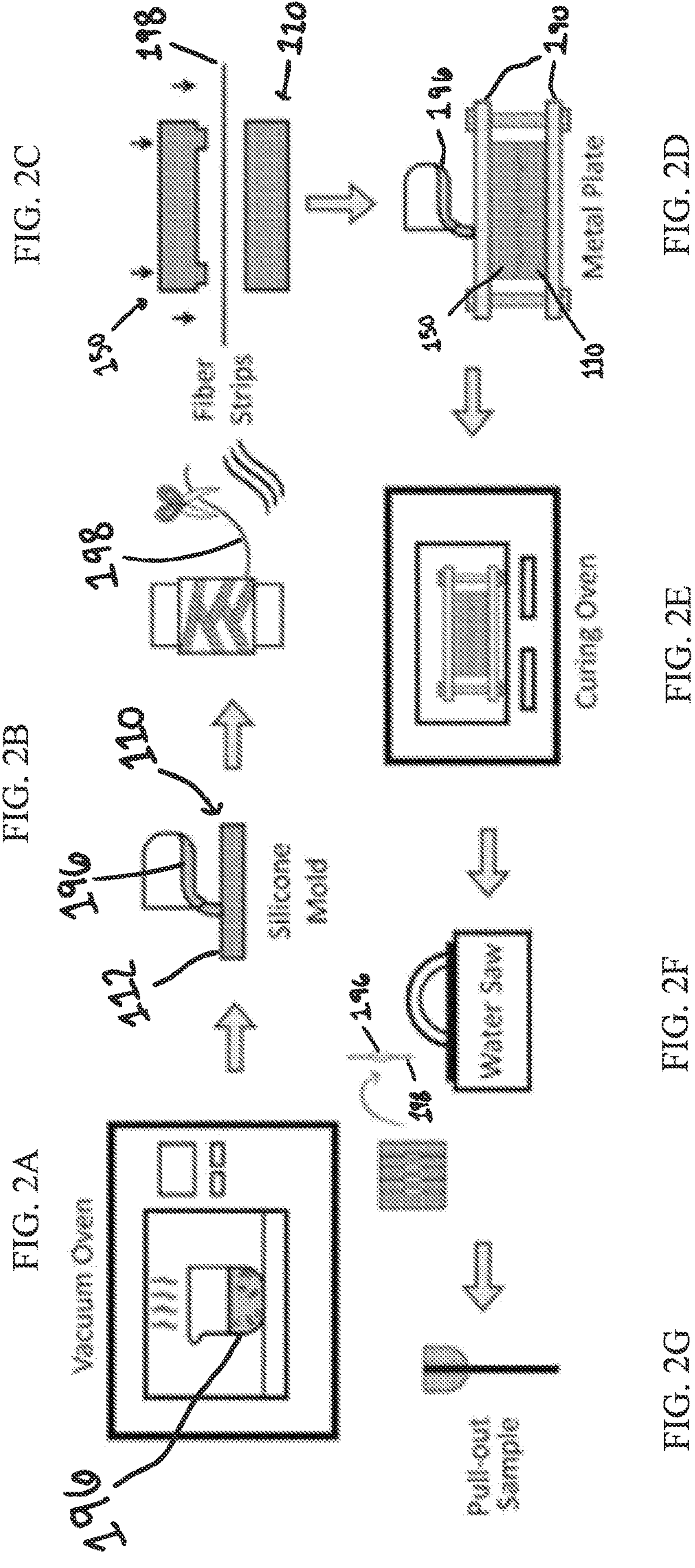
FIGS. 2A-2G are a flow chart of the steps of using the mold of FIG. 1A to form a composite sample for a pullout test.

To form a composite sample for a pullout test using the mold 100 shown in FIGS. 2A-2G and described above, resin 196 is heated to a temperature below a reaction temperature of the resin 196 to degas the resin 196 and eliminate any bubbles existing therein, as shown in FIG. 2A. Once the bubbles are removed from the resin 196, the resin 196 is poured into each of the slots 120 defined by the first surface 112 of the first body 110, as shown in FIG. 2B. Fibers 198 are then cut to size and placed within the channels 130 such that the fibers 198 extend into the resin 196 in the respective slots 120, as shown in FIG. 2C. Because the longitudinal axes of two channels 132 are colinearly aligned for each slot 120, the fibers 198 can extend from one channel 130, through the slot 120, and into the colinearly aligned channel 130 on the other side of the slot 120. The ends of the fibers 198 are then disposed within the grooves 140 that intersect the channels 130 to hold the fibers 198 in place and in a straight/taut orientation.

The second body 150 is then lowered onto the first body 110 such that the first surface 112 of the first body 110 abuts the second surface 154 of the second body 150. In this configuration, each of the ridges 160 of the second body 150 extend into a different one of the channels 130 of the first body 110 to hold the fibers 198 within the channels 130 in place. Because the channels 130 are V-shaped, the ridges 160 press the fibers 198 into the tapered bottoms of the channels 130 to ensure that the fibers 198 are all positioned similarly to each other in each channel 130.

After the second surface 154 of the second body 150 is disposed adjacent the first surface 112 of the first body 110, compression plates 190 are applied to the first body 110 and the second body 150 to apply force to the first body 110 and the second body 150 to urge the first surface 112 of the first body 110 toward the second surface 154 of the second body 150, as shown in FIG. 2D. More resin 196 is then poured through each of the resin openings 162 of the second body 150 and into the slots 120 of the first body 110 to ensure that each of slots 120 is entirely filled.

The entire mold 100, including the compression plates 190, are then placed into a curing oven to cause the resin 196 within the mold 100 to cure, as shown in FIG. 2E.

After the resin 196 has cured, the cured resin 196 is cut in half, perpendicular to the longitudinal axes of the channels 132, using a water saw or similar cutting device such that the resin 196 is divided into two composite samples, as shown in FIG. 2F. Thus, each of the two composite samples includes a portion of fiber 198 protruding from the portion of cured resin 196, as shown in FIG. 2G.

To use the composite samples in a pullout test, the cured resin composite sample is disposed within a fixture opening 172 defined by a testing fixture 170, as shown in FIG. 1B. As seen in FIG. 1B, the fixture opening 172 of the testing fixture 170 is a size and a shape to correspond with the size and shape of the cured resin composite sample.

The testing fixture 170 also includes an attachment portion 174 that is couplable to a tensile testing machine. The composite sample is positioned in the fixture opening 172 such that the fiber 198 extends out of the fixture opening 172 in a direction opposite of the attachment portion 174 of the tensile testing machine. The loose end of the fiber 198 is then secured relative to the tensile testing machine such that force exerted by the tensile testing machine on the testing fixture 170 transfers the force to the composite sample in a direction parallel to the longitudinal axis of the fiber 198. The tensile testing machine continues to apply an increasing amount of force to the composite sample until the connection of the cured resin to the fiber fails.

EXAMPLES

The horizontal mold concept is illustrated in FIG. 1A. Alumilite's Plat 55 silicone was used to create a stable mold for samples. The mold consists of racetrack-shaped slots with channels where the fibers are placed horizontally. Each slot produces two samples after cutting them in half after curing. The mold has grooves at the end of the channels to keep the fibers in tension and prevent fiber scattering. A custom specimen fixture for holding the sample was designed to accommodate the sample's shape easily and to be able to test on a conventional tensile machine, as shown in FIG. 1B.

To conduct the investigation, three different polymer resins were used: EPON™ 862 (Diglycidyl Ether of Bisphenol F)/Epikure W (purchased from Miller Stephenson), CYCOM® 977-3, and CYCOM® 5250-4 (supplied by Solvay). Epon 862 (Epoxy) was mixed at a mass ratio of 100:26.4 with Epikure W curing agent, while 977-3 (Tough Epoxy) and 5250-4 (BMI) were provided premixed and stored in the refrigerator under 0° F. This study used CNT yarn (supplied by Nanocomp Technologies) and HexTow® IM7 12K CF as reinforcements. Herein, the samples are denoted as CNTY/Epoxy, CNTY/BMI, CNTY/ToughEpoxy, IM7/Epoxy, IM7/BMI, and IM7/ToughEpoxy.

Subsequent steps were taken to prepare a resin carbon fiber composite. All resins are first heated below their reaction temperature. This process decreases the viscosity of the resin which is needed to mold the matrix. Once the specified viscosity was achieved, the resin began the degassing process to eliminate the bubbles after curing (FIG. 2A). Once no bubbles are observed in the resin, it is poured into preheated silicone molds before the fiber is placed (FIG. 2B). Then, the fibers are cut and placed within the silicon mold (FIG. 2C). The mold is enclosed with a silicone cover, then pressed under metal plates and refilled to complete the slot's volume (FIG. 2D). This setup is then placed in a curing oven with a standard curing cycle of the respective resin (FIG. 2E). Once the resin is cured, the samples are demolded from the silicon mold. To match the fixture used for the pullout test, each sample was cut in half using a water saw (FIG. 2F). If needed, the samples were polished from the flat surface to make a pullout sample with the required embedded length (FIG. 2G). Finally, the samples are tabbed with sandpaper to avoid fiber slippage during the testing.

When removed from the mold, the IM7 CF has resin hardened due to the wicking effect during curing that allowed the resin to travel into the dry fiber tow even though the silicone mold is tight around the tow. The CNT yarns do not show this wicking effect, potentially due to encapsulated voids that do not allow resin to flow during manufacturing. Samples were carefully selected so that the hardened resin does not affect the testing. During manufacturing, IM7 CF were minimally twisted to avoid CF scattering. However, twisting effect on the interface was not evaluated in this study. CNT yarns are also known to be minimally twisted during their manufacturing process and, thus, can be compared similarly with twisted carbon fibers.

Pullout mechanical tests were carried out at ambient temperature using a tensile machine (Model AGS-J, Shimadzu Scientific Inc. Japan) with 500 N and 5000 N load cells for SFPO and FBPO, respectively. The tensile load was applied to one end at a constant crosshead speed of 2.5 mm/min. All samples were tested using this configuration. The force-displacement curves were recorded with Trapezium X software to select the appropriate samples for analysis. The clamps of the mechanical machine were tight enough to grab the fibers without damaging them. Samples with damaged fibers after testing were not used as valid test data.

Figure 3:
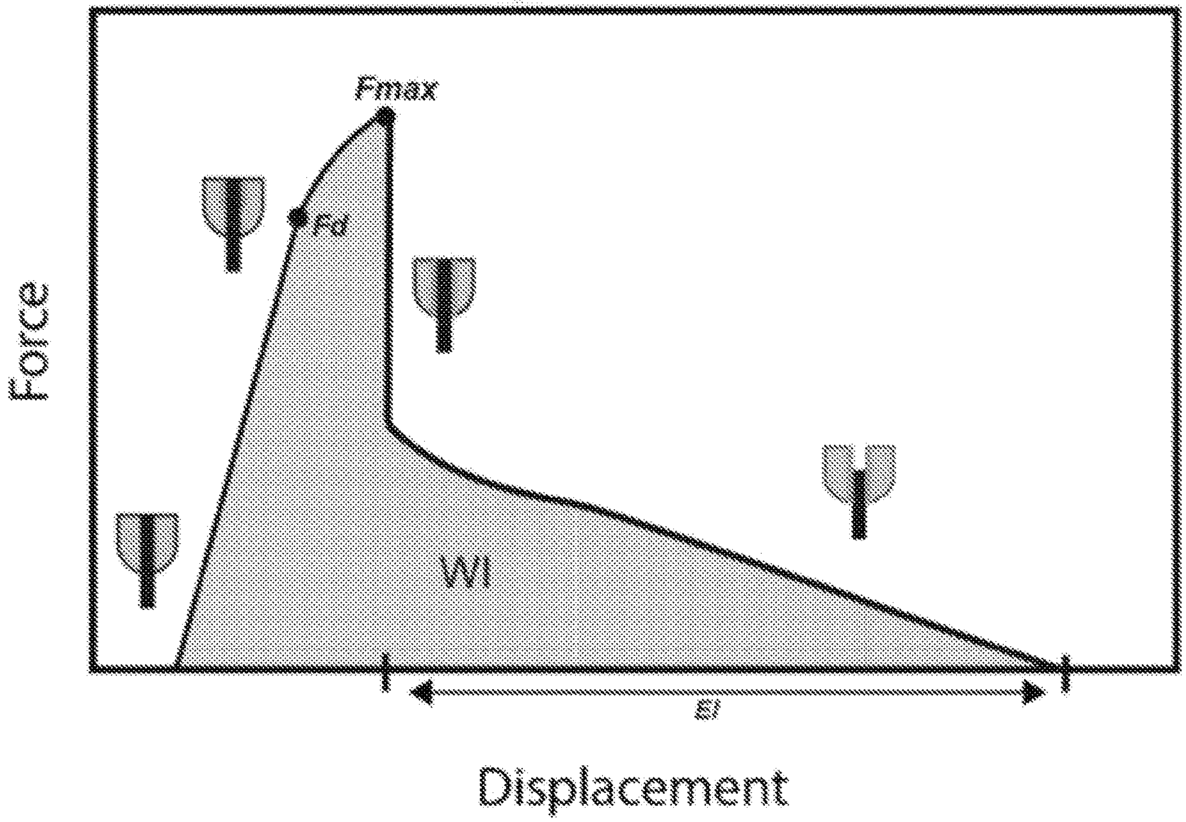
FIG. 3 is a graph of a typical load-displacement curve of a pullout process performed on composite samples formed with the mold of FIG. 1A.

The typical force-displacement curve of the pullout test has various stages, as illustrated in FIG. 3. The force increases linearly from 0 to Fd (debond force). Between that region, the interface remains intact due to elastic behavior. It is reported in the literature that a linear relationship between Fd and fiber's embedded area exists. Debonding starts to occur between Fd and Fmax, and cracks begin to spread along the fiber's embedded length. Within that region, friction is added, and the overall force increases with displacement. A higher Imax is obtained on specimens with higher embedded length due to increased adhesive bonding. When the force reaches Fmax, the force drops abruptly to a lower force value, representing complete debonding from the matrix. Then, fiber starts sliding off the matrix until getting wholly separated. The work done by the interface (WI) varies within each specimen, and interface defects or fiber bundle deviations influence it during the manufacturing process.

Depending on assumptions made on the pullout model, different ways to calculate the IFSS have been reported. However, the traditional method is based on a constant shear model $$\tau IFSS = \frac{Fmax}{\pi dl} \tag{1}$$

where Fmax represents the peak force required to complete the pullout, d is the fiber diameter, and l is the fiber's embedded length into the matrix. This equation assumes a uniform cylindrical fiber with a surrounding matrix where stresses are uniformly distributed. To assess the interfacial bonding, the IFSS should be considered as a semi-quantitative tool to determine whether improvements are obtained by changing the matrix and reinforcement. In other words, the interfacial bond may be observed as "good" or "poor" and is highly influenced by the fiber and the matrix. It is important to emphasize that the interfacial bonding is usually much weaker than the strength of fibers and matrix.

The embedded length plays a vital role in the determination of IFSS. This factor needs to be controlled to avoid fiber breakage during the pullout procedure. If the force to shear the interface is larger than the tensile strength of the fiber, fiber breakage will occur before interface debonding. For a successful pullout test, the critical embedded length should follow the equation $$Le < \frac{\sigma f \cdot Df}{4\tau \cdot IFSS} \tag{2}$$

Where Le is the embedded length, σf is the tensile strength of the fiber, Df is the fiber diameter, and τIFSS is the apparent IFSS. However, a short embedded length may affect the pullout procedure by eliminating interfacial friction, thus affecting the force-displacement curve. The term "Df" assumes a uniform circular fiber bundle. This formula was utilized for theoretical calculations.

Figure 4:
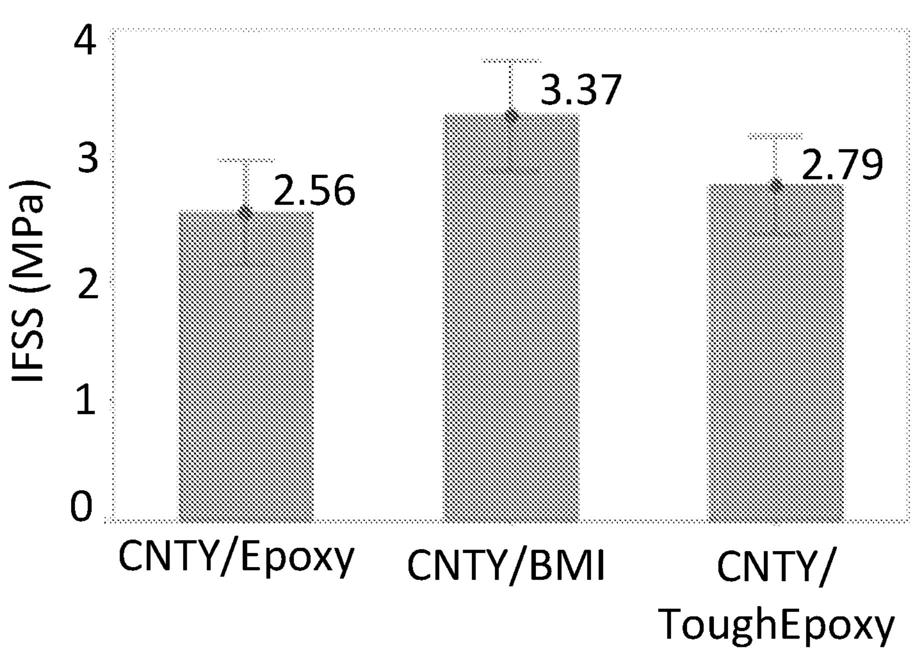
FIG. 4 is graphs of apparent IFSS results of the constituent fiber/matrix pairings.
Figure 4:
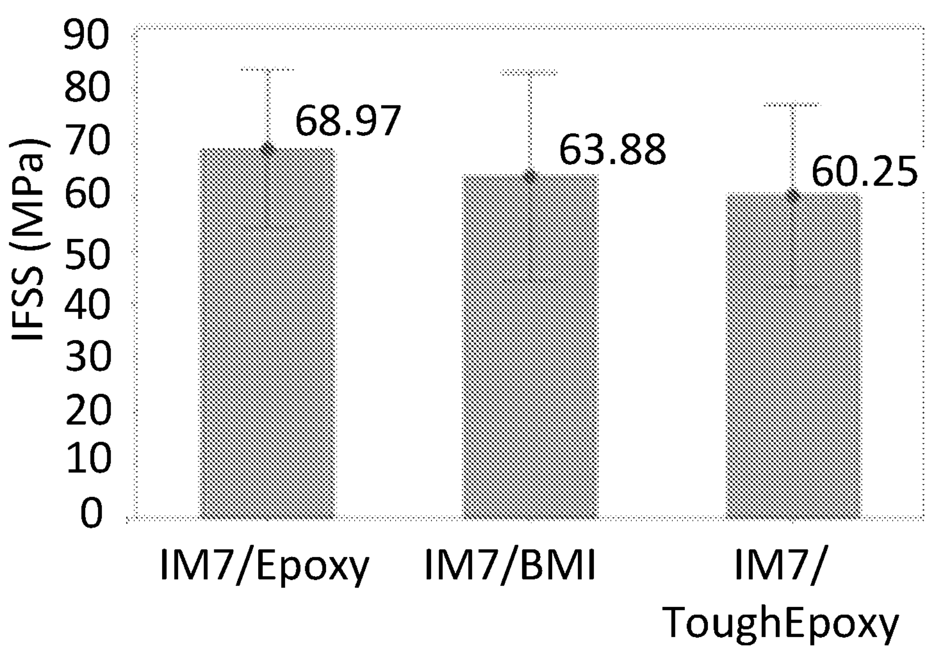

The IFSS means and standard errors of the material pairings are shown in FIG. 4. The means of CNTY/Epoxy, CNTY/BMI, and CNTY/ToughEpoxy are 2.564, 3.368, and 2.789 MPa. To determine whether changing matrices improves the apparent IFSS, a one-way ANOVA was conducted to check if statistical evidence shows that population means are significantly different. The analyses were performed with Minitab, and their respective output is summarized in Appendix A (CNTY specimens) and Appendix B (IM7 specimens). A pairwise comparison test shows that the means of CNTY/Epoxy and CNTY/BMI are statistically different. Therefore, changing the matrix from Epoxy to BMI improves the apparent IFSS, but changing the matrix from ToughEpoxy to BMI or Epoxy to ToughEpoxy does not improve apparent IFSS. On the other hand, the means of IM7/Epoxy, IM7/BMI, and IM7/ToughEpoxy are not statistically different. Hence, changing matrices does not appear to improve the apparent IFSS for IM7 in the matrices used in this study. The major differences in apparent IFSS are between fiber bundle types, with a difference between Epoxy and BMI matrices for the CNT yarn case. FIG. 4 is consistent with ANOVA findings.

Figure 5:
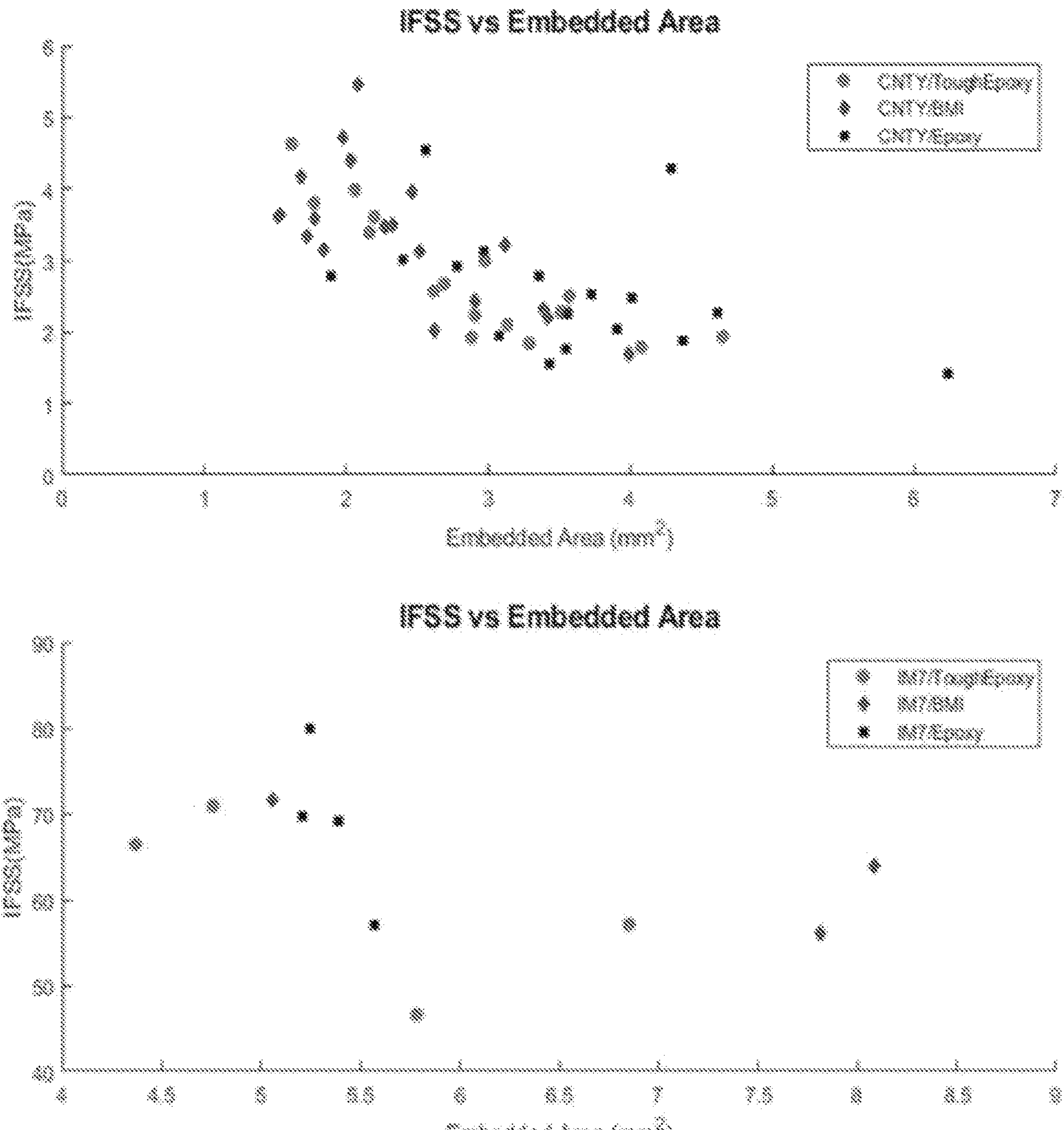
FIG. 5 is graphs of the relationship between IFSS and embedded area of all specimens.

Apparent IFSS as a function of the embedded area is illustrated in FIG. 5. It is observed that IFSS decreases as the embedded area increases, especially for CNT yarns. A large spread of data points is observed due to variations in fiber circumference, embedded length, and non-uniform fiber surface. The IFSS is not only sensitive to fiber geometry, but also material variability and fabrication methods. Since no standards exist for this test, human error amplifies discrepancy between the true IFSS and apparent IFSS but may better represent large man-made parts.

Similarly, apparent IFSS decreases with increased embedded length and embedded area. Compared to CNT yarn specimens, fewer replications of IM7-CF specimens were analyzed due to the high interface and brittle resin failure modes. Specimens with a stronger interface require more force to create cracks along the fiber's surface to break up interfacial bonds. Brittle-matrix fiber-reinforced composites usually fail in a catastrophic brittle manner.

Figures 6A, 6B, 6C, 6D, 6E, 6F:
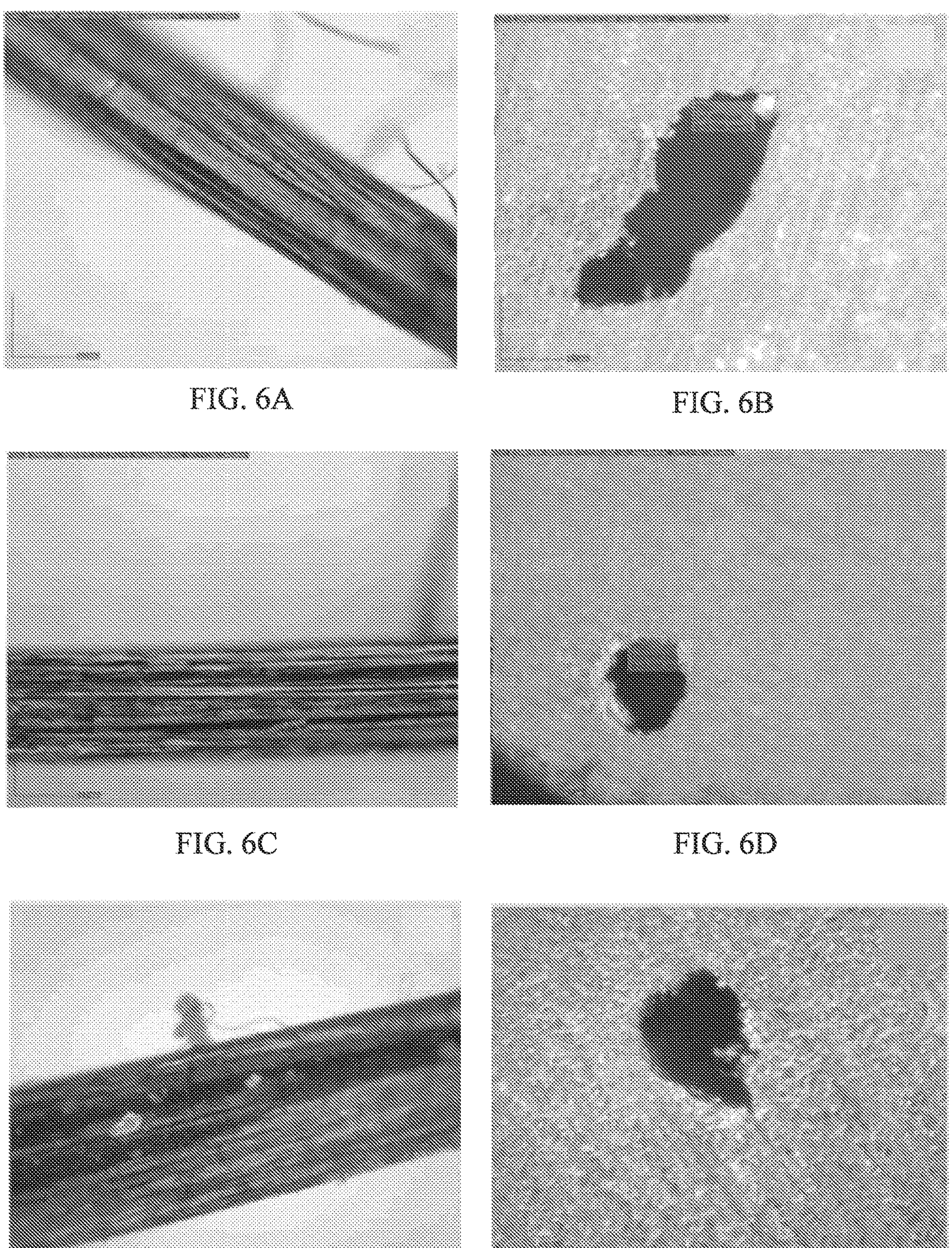
FIG. 6A is a microscopical image of a CNTY/Epoxy surface according to one implementation.
FIG. 6B is a microscopical image of a CNTY/Epoxy hole after testing according to one implementation.
FIG. 6C is a microscopical image of a CNTY/ToughEpoxy surface according to one implementation.
FIG. 6D is a microscopical image of a CNTY/ToughEpoxy hole after testing according to one implementation.
FIG. 6E is a microscopical image of a CNTY/BMI surface according to one implementation.
FIG. 6F is a microscopical image of a CNTY/BMI hole after testing according to one implementation.

After testing, microscopical observations of the CNT yarn and IM7 CF surfaces were conducted to investigate the bonding morphology. FIGS. 6A, 6C, and 6E show no residual resin attached to the CNT yarn surface, reflecting poor interfacial adhesion to polymer matrices. The optimization of CNT composites interfaces is still unclear. Approaches such as physical, and chemical treatments of the fiber surface have been devoted. However, in some cases, these approaches fail to improve the apparent IFSS.

Figures 7A, 7B, 7C, 7D, 7E, 7F:
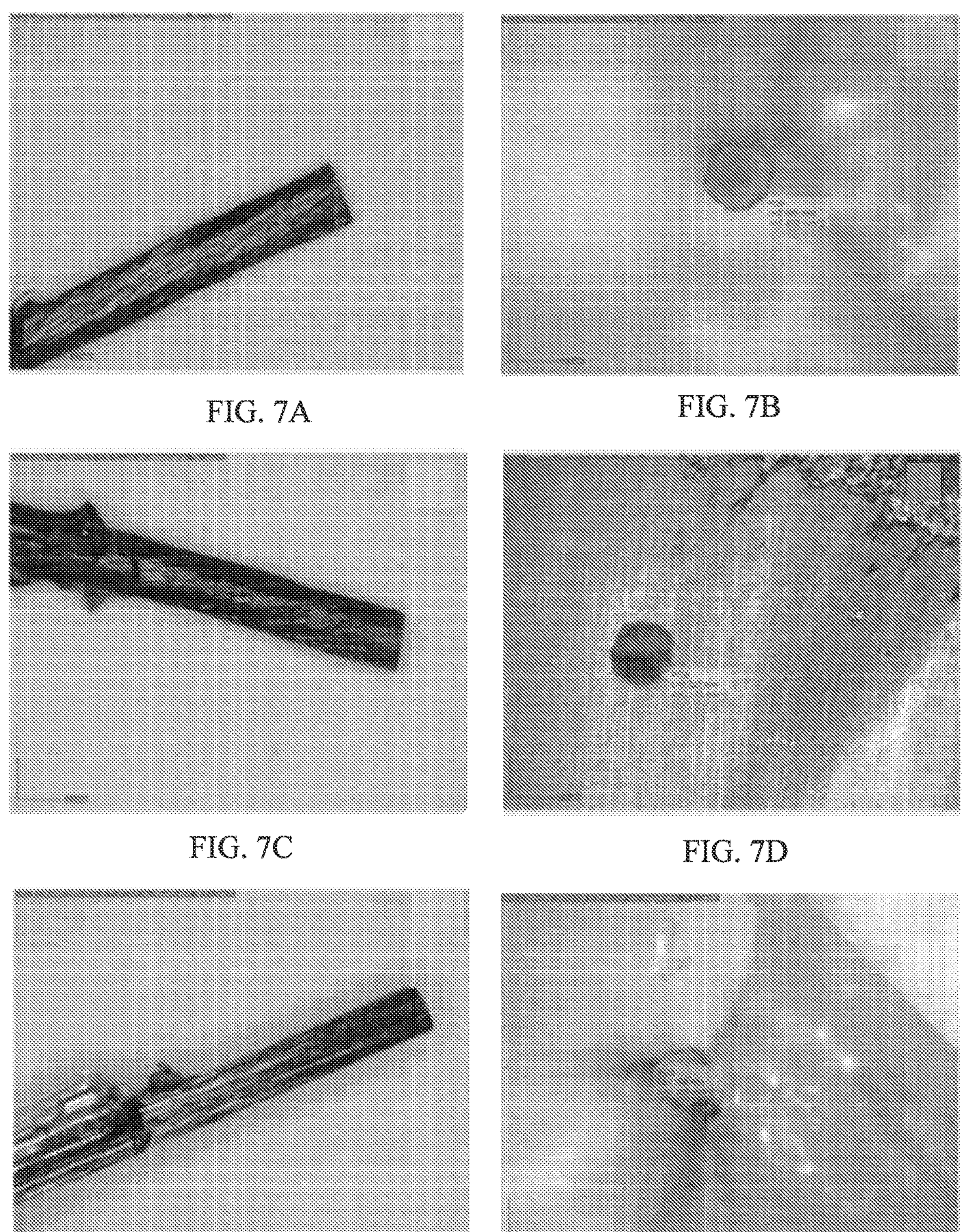
FIG. 7A is a microscopical image of a IM7/Epoxy surface according to one implementation.
FIG. 7B is a microscopical image of a IM7/Epoxy hole after testing according to one implementation.
FIG. 7C is a microscopical image of a IM7/ToughEpoxy surface according to one implementation.
FIG. 7D is a microscopical image of a IM7/ToughEpoxy hole after testing according to one implementation.
FIG. 7E is a microscopical image of a IM7/BMI surface according to one implementation.
FIG. 7F is a microscopical image of a IM7/BMI hole after testing according to one implementation.

FIGS. 7A, 7C, and 7E show residual resin from the meniscus region. This is caused by the distance of the knife-edges of the testing fixture, which causes the matrix to crack as force increases. This cracking shows that the fiber was not pulled out under a pure debonding process. However, the influence of matrix cracking was not considered on test results. FIGS. 7B, 7D, and 7F show that no CFs were attached to the entrance of the holes, which demonstrates that the CF bundle can be considered as a large single filament for circumference calculation. In addition, the holes left of all specimen types (FIGS. 6B, 6D, 6F, 7B, 7D, and 7F) indicate varied cross-sectional shape of the fibers.

Figures 8A, 8B, 8C, 8D, 8E, 8F:
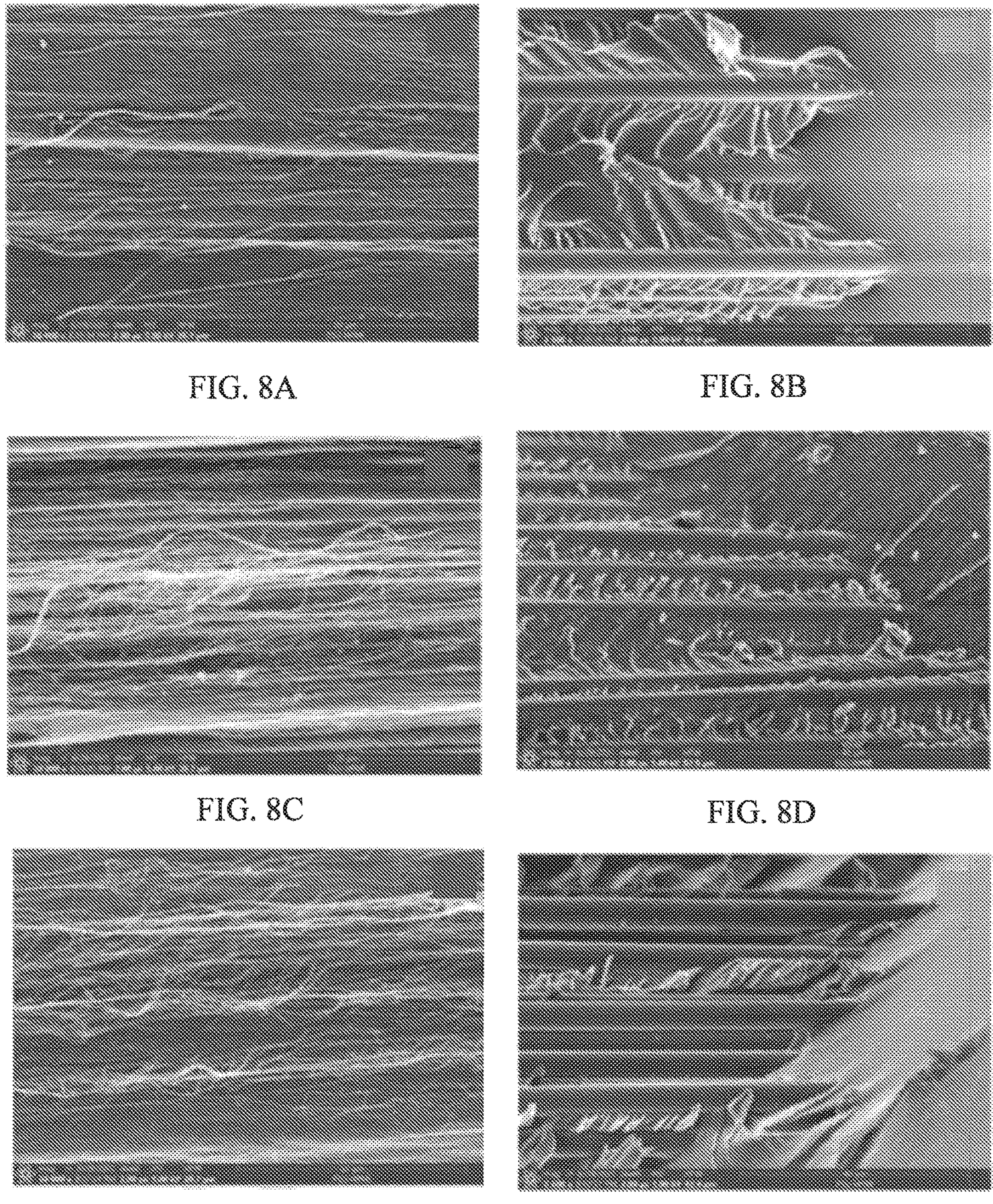
FIG. 8A is a SEM image of a CNTY/Epoxy surface according to one implementation.
FIG. 8B is a SEM image of a IM7/Epoxy surface according to one implementation.
FIG. 8C is a SEM image of a CNTY/ToughEpoxy surface according to one implementation.
FIG. 8D is a SEM image of a IM7/ToughEpoxy surface according to one implementation.
FIG. 8E is a SEM image of a CNTY/BMI surface according to one implementation.
FIG. 8F is a SEM image of a IM7/BMI surface according to one implementation.

Scanning electron microscopy (SEM) was conducted on fiber surfaces after testing for a more detailed morphology investigation. FIGS. 8A, 8C, and 8E show very small or no resin particles attached to the CNT surface. However, FIGS. 8B, 8D, and 8F show much more resin attached to the CF surface, reflecting better adhesion. It is noted that the IFSS means of IM7-CF specimens correlate to the amount of resin attached. IM7/Epoxy (FIG. 8B) shows more resin attached than the other two specimens.

The work done by the interface was determined with the area under force-displacement curves. The work done by the interface for each sample combination is summarized in FIG. 9. For comparison, one representative sample of each specimen type was selected, as shown in FIGS. 10A and 10B. A higher work is associated with greater resistance to crack growth and a higher toughness in composites.

The graph can be divided into two stages: (1) the area before the I'max, which consists of the energy needed to propagate the cracks along the fiber's embedded length, and (2) the area after the F'max, which consists of the energy to pull out the fiber from the matrix after all cracks have been propagated. In this last stage, frictional forces are taking place, and the fiber's roughness influences it. The energy needed to debond varies within each sample, and it was observed that higher fiber embedded lengths produce higher frictional forces during pullout.

The IM7 fiber and CNT yarn surfaces were analyzed using AFM that reveals the surface profile and nano-roughness that can be quantified by the mean roughness (Ra) and the root mean square roughness (Rq). The interfacial adhesion is not only influenced by the roughness but also the chemical composition, additives to the surface, as well as compatibility with the matrix.

AFM of the IM7 fiber surface is seen in FIG. 11A. Multimode AFM with nano-scope V with a scan size of 750 nm with the fiber orientation in the y-direction. The surface of the IM7 seen in FIG. 11A shows relatively uniform striations in the axis direction that are seen on a micron and nanoscale with a curvature due to fiber diameter. The AFM data for IM7 fiber shows an Ra value of 7.83 nm and Rq value of 9.52 nm, which are in line with expectations of similar fibers and scanned size. The surface of the CNT yarn is seen in FIG. 11B where CNT bundles can be seen with small agglomerations that are likely amorphous carbon or impurities and shows an Ra value of 3.25 nm and Rq value of 4.14 nm. The IM7 fiber roughness values are more than double that of the CNT yarn, which likely contributes to a significant IFSS and work done by the interface.

A Helios G4 UC (Thermo Fisher Scientific, Waltham, MA, USA) scanning electron microscope with an Oxford X-MaxN detector was used for Energy-dispersive X-ray spectroscopy (EDS) analysis on fibers to determine the elements present on the embedded part (after FBPO test) of fiber tow compared to the neat fiber. Three different sites were analyzed for each fiber/resin case and averaged for further comparison. Oxygen is a well-known element present in all resins used, which can easily be captured through EDS analysis when samples are excited through an electron beam. As the IM7 and CNTY are made mostly of carbon, the oxygen and carbon atomic content were calculated on each FBPO tested sample and neat fibers. The comparison between the atomic content of elemental oxygen present on the embedded area part of the fiber to the neat fiber can explain the presence of resin particles on the tow surface which further explains the interface quality between fiber and resin.

The overall increase in oxygen content averaged across all three resin types is about 1252% for IM7 fiber case and 71% for the CNT yarn case. Such a vast difference in the percentage increase in oxygen content between the IM7 and CNTY cases may be explained by the presence of more resin on the IM7 fiber surface than that of CNTY. This presence of more resin indicates the higher interfacial strength for IM7/resin case than the CNTY/resin case. The presence of more resin and a better interface for the IM7/resin case can result from the high surface roughness of IM7 compared to CNTY, as depicted through AFM analysis.

The oxygen content increment for the IM7/Epoxy case is significantly higher by 500% than the other two IM7/resin cases. This significantly higher oxygen increment further explains that the IM7 has a much higher interface with Epoxy than the other two resins, which aligns with the apparent IFSS obtained through experiments. No such significant increment was observed among CNTY/resin cases. The presence of oxygen captured through EDS analysis cannot reflect the bonds present between oxygen and carbon or between other resin elements with the carbon of the fiber.

The major downside of the traditional pullout method is sample manufacturing and handling. The current state-of-art produces a single sample per batch and uses a vertical sample manufacturing method that causes fiber bundle scattering and is limited to low viscosity matrices. Inserting the fiber bundle vertically onto the matrix produces bundle scattering (FIG. 12A). As a solution, the bundle is coated with a thin layer of epoxy (Epoxy-1), then another epoxy system (Epoxy-2) is poured around the bundle after Epoxy-1 was cured (FIG. 12B). This configuration usually fails to characterize the IFSS since fractures may occur at the interphase between Epoxy-1 and Epoxy-2.

The horizontal mold allows for large batch manufacturing and can accommodate matrices with a wide range of viscosities, including high viscosity commercial resins that are challenging to mold and cannot be molded vertically (FIG. 12C). In addition, the manufacturing method solves the problem of testing nanomaterial and micromaterial bundle interfaces using the same design. This allows for testing with a consistent mechanical fixture that is matched to the design and can be used in most existing mechanical testing load frames. The geometry of the channels (FIG. 12D) can be modified to accommodate commercial, desized, and surface-modified fibers.

The interface strength of CNT yarns and IM7-CF with different polymer matrices were compared using the pullout test. The horizontal mold successfully allowed the manufacturing of specimens with low and high viscosity matrices. The means of all specimens were compared using one-way ANOVA and Tukey's studentized range. For CNTY specimens, the analysis concludes that changing the matrix from Epoxy to BMI improves the apparent IFSS but changing the matrix from Tough Epoxy to BMI or from Epoxy to Tough Epoxy does not improve apparent IFSS. For IM7 specimens, the analysis concludes that changing matrices does not appear to improve the apparent IFSS. SEM images demonstrated that CNT yarns reflected weak interfacial adhesion due to few or no resin attached to the surface. However, the residual resin was notorious on IM7-CF specimens, especially on IM7/Epoxy specimens with the highest IFSS. This work demonstrates that horizontal manufacturing is a promising way to produce high quantity batches and test samples with different matrix viscosities. The mold can be modified based on desired specimen quantity, size, and geometry, and improvements to reduce matrix leakage and fiber bundle scattering. This will allow researchers to obtain faster results and better understand the interfacial behavior between matrices and reinforcements that have not been thoroughly studied.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A mold for forming composite samples for a pullout test, the mold comprising:

a first body having a first surface and a second surface spaced apart from the first surface, wherein the first surface defines one or more slots and one or more channels, wherein each of the one or more channels has a longitudinal axis, wherein at least one of the one or more channels intersects one of the one or more slots;

a second body having a first surface and a second surface spaced apart from the first surface, wherein the first surface of the second body defines one or more ridges configured to be disposed within a separate one of the one or more channels when the second surface of the second body is disposed adjacent to the first surface of the first body, wherein the second surface of the second body further defines one or more resin openings extending to the first surface of the second body, wherein each of the one or more resin openings is configured to be disposed adjacent to a separate one of the one or more slots when the second surface of the second body is disposed adjacent the first surface of the first body such that the one of the one or more slots is in fluid communication with the respective resin opening.

2. The mold of claim 1, wherein the at least one channel intersecting the one of the one or more slots comprises two channels.

3. The mold of claim 2, wherein the longitudinal axes of the two channels are collinear.

4. The mold of claim 3, wherein each of the one or more slots has a longitudinal axis and the longitudinal axes of the two channels intersecting the one of the one or more slots are parallel to the longitudinal axis of the one of the one or more slots.

5. The mold of claim 1, wherein the first body has an end surface extending between the first surface and the second surface, wherein at least one of the one or more channels extends to the end surface, such that the one or more slots are in fluid communication with an outside environment via the one or more channels that extend to the end surface.

6. The mold of claim 5, wherein the end surface defines at least one groove having a longitudinal axis, wherein the longitudinal axis of at least one of the one or more channels intersects the longitudinal axis of the at least one groove.

7. The mold of claim 1, wherein each of the one or more slots are discorectangular shaped as viewed in a plane defined by the first surface.

8. The mold of claim 1, wherein each of the one or more slots has a longitudinal axis and the longitudinal axis of the at least one of the one or more channels intersecting the one of the one or more slots is parallel to the longitudinal axis of the one of the one or more slots.

9. The mold of claim 8, wherein the longitudinal axis of the at least one of the one or more channels intersecting the one of the one or more slots is collinear with the longitudinal axis of the one of the one or more slots.

10. The mold of claim 1, wherein the body comprises silicone.

11. The mold of claim 1, wherein the one or more channels further comprise a V-shaped cross-sectional shape with a tapered bottom, the one or more channels configured to receive and retain a fiber therein, said fiber intersecting one of the one or more slots.

12. The mold of claim 11, wherein one of the first surface of the first body or the second surface of the second body defines at least one locator opening, and the other of the second surface of the second body or the first surface of the first body defines a locator protrusion configured to disposed within the locator opening when the second surface of the second body is disposed adjacent the first surface of the first body.

13. The mold of claim 1, wherein the one or more resin openings are configured to receive a pourable resin that is curable within the mold.

14. A method of forming a composite sample for a pullout test, the method comprising:

providing a mold comprising:

a body having a first surface and a second surface spaced apart from the first surface, wherein the first surface defines one or more slots and one or more channels, wherein each of the one or more channels has a longitudinal axis, wherein at least one of the one or more channels intersects one of the one or more slots;

disposing a resin within the one of the one or more slots;

disposing a fiber within the at least one of the one or more channels intersecting the one of the one or more slots such that a portion of the fiber is disposed within the one of the one or more slots; and causing the resin to cure.

15. The method of claim 14, wherein the body is a first body, the mold further comprising a second body having a first surface and a second surface spaced apart from the first surface, wherein the second surface of the second body defines one or more ridges, the method further comprising, after disposing the fiber within the at least one of the one or more channels, disposing the second surface of the second body adjacent the first surface of the first body such that each of the one or more ridges is disposed within a separate one of the one or more channels.

16. The method of claim 15, further comprising, after disposing the second surface of the second body adjacent the first surface of the first body, applying force to the first body and/or the second body to urge the first surface of the first body toward the second surface of the second body.

17. The method of claim 14, further comprising, before disposing the resin within the one of the one or more slots, preheating the resin to a temperature below a reaction temperature of the resin.

18. The method of claim 14, further comprising, after causing the resin to cure, dividing the cured resin into at least two portions of cured resin, wherein each of the at least two portions of cured resin includes a portion of fiber protruding from the portion of cured resin.

19. The method of claim 14, further comprising, after causing the resin to cure, disposing at least a portion of the cured resin within a fixture opening defined by a testing fixture, wherein a size and a shape of at least a portion of the fixture opening corresponds to a size and a shape of the portion of the cured resin.

20. The method of claim 19, further comprising coupling the testing fixture to a tensile testing machine.

* * * * *